US008250938B2

(12) United States Patent
Earp et al.

(10) Patent No.: US 8,250,938 B2
(45) Date of Patent: Aug. 28, 2012

(54) VEHICLE TRANSMISSION

(75) Inventors: Leonard Earp, Wrexham (GB); David Allan Wozencraft, Oswestry (GB)

(73) Assignee: JCB Transmissions, Uttoxeter (GB)

( * ) Notice: Subject to any disclaimer, the term of this patent is extended or adjusted under 35 U.S.C. 154(b) by 682 days.

(21) Appl. No.: 12/178,119

(22) Filed: Jul. 23, 2008

(65) Prior Publication Data
US 2009/0025496 A1    Jan. 29, 2009

(30) Foreign Application Priority Data
Jul. 23, 2007  (GB) .................................. 0714320.9

(51) Int. Cl.
F16H 3/08       (2006.01)
F16H 37/06      (2006.01)

(52) U.S. Cl. ........................................... 74/331; 74/664
(58) Field of Classification Search .................... 74/329, 74/331, 664, 665 R, 665 F, 665 G, 665 GA
See application file for complete search history.

(56) References Cited

U.S. PATENT DOCUMENTS

| 2,953,942 | A |  | 9/1960 | Schwartz et al. |
| 2,972,901 | A |  | 2/1961 | Gerst |
| 3,319,745 | A |  | 5/1967 | Hilpert |
| 3,675,508 | A |  | 7/1972 | Blank |
| 3,802,293 | A | * | 4/1974 | Winckler et al. ................. 74/745 |
| 3,916,714 | A |  | 11/1975 | Sisson et al. |
| 4,033,197 | A | * | 7/1977 | Shikiya et al. .................. 74/331 |
| 4,063,464 | A |  | 12/1977 | Crabb |
| 4,627,302 | A |  | 12/1986 | Laylock et al. |
| 4,721,002 | A |  | 1/1988 | Horii |
| 4,785,682 | A |  | 11/1988 | Nishimura et al. |
| 4,877,116 | A |  | 10/1989 | Horsch |

(Continued)

FOREIGN PATENT DOCUMENTS
DE         3410802       10/1984
(Continued)

OTHER PUBLICATIONS

European Search Report for European application 08 160 658, issued Oct. 17, 2008.

Primary Examiner — David D Le
Assistant Examiner — Michael Gonzalez
(74) Attorney, Agent, or Firm — Greenlee Sullivan P.C.

(57) ABSTRACT

An automatic powershift vehicle transmission comprising an input shaft; an output shaft; first and second intermediate shafts parallel to the input shaft; a lay shaft parallel to the output shaft; gearing providing first, second, third and fourth forward driving paths from the input shaft to the output shaft; a first clutch and a second clutch between the ends of the input shaft to establish driving connections; a third clutch for establishing the first or third forward driving path when the first clutch is operative; and a fourth clutch for establishing the second or fourth forward driving path when the second clutch is operative.

22 Claims, 4 Drawing Sheets

U.S. PATENT DOCUMENTS

| | | | |
|---|---|---|---|
| 5,007,299 A | 4/1991 | Bulgrien | |
| 5,181,431 A | 1/1993 | Zaiser | |
| 5,251,132 A | 10/1993 | Bulgrien | |
| 5,974,905 A * | 11/1999 | Hedman | 74/331 |
| 6,021,684 A * | 2/2000 | Alfredsson | 74/331 |
| 6,050,152 A * | 4/2000 | Alfredsson | 74/325 |
| 6,209,407 B1 | 4/2001 | Heinzel et al. | |
| 6,250,171 B1 | 6/2001 | Sperber et al. | |
| 6,491,604 B1 | 12/2002 | Katou et al. | |
| 6,766,705 B1 * | 7/2004 | Hall, III | 74/331 |
| 6,845,682 B1 * | 1/2005 | Bulgrien | 74/331 |
| 6,988,426 B2 * | 1/2006 | Calvert | 74/331 |
| 7,080,567 B2 * | 7/2006 | Hatakeyama | 74/331 |
| 7,478,572 B2 * | 1/2009 | Maten et al. | 74/340 |
| 7,730,807 B2 * | 6/2010 | Kim et al. | 74/745 |
| 2008/0053261 A1 | 3/2008 | Wright | |
| 2008/0081738 A1 | 4/2008 | Earp et al. | |

FOREIGN PATENT DOCUMENTS

| | | |
|---|---|---|
| DE | 10232837 | 2/2004 |
| EP | 0354890 | 2/1990 |
| EP | 0087681 | 7/1992 |
| EP | 1 772 651 A | 4/2007 |
| GB | 1190972 | 5/1970 |
| GB | 2271821 | 1/1996 |
| GB | 0619502 | 10/2006 |
| WO | WO2004/076888 | 9/2004 |
| WO | WO2008/116562 | 10/2008 |

* cited by examiner

VEHICLE TRANSMISSION

CROSS-REFERENCE TO RELATED APPLICATIONS

This application claims priority under 35 USC 119(a)-(d) to United Kingdom Patent Application No. GB 0714320.9 filed on Jul. 23, 2007, which is incorporated by reference in its entirety herein.

BACKGROUND OF THE INVENTION

This invention relates to a vehicle transmission, for interposition between a prime mover of the vehicle and ground-engaging means of the vehicle and providing a plurality of gear ratios by which the ground-engaging means can be driven by the prime mover, and particularly but not exclusively to a vehicle transmission for material-handling vehicles. By "material handling vehicle", we mean, for example, a tractor, loader type or similar vehicle for industrial and/or agricultural use, in which the ground engaging means typically comprises wheels, but could also include crawler tracks.

Vehicles such as tractors or loaders conventionally have utilised transmissions which provide a range of different gear ratios, for example four ratios. Such a transmission typically includes a plurality of clutches, one of which is conventionally known as the "forward" clutch, and one of which is conventionally known as a "reverse" clutch. The "forward" clutch is operable to engage a gear(s) within the transmission to effect rotation of the output shaft such that the vehicle moves forwards and the "reverse" clutch is operable to engage a further gear(s) within the transmission to effect rotation of the output shaft in an opposite direction. At least one other clutch is also provided which is operable to engage yet further gears within the transmission so as to provide different gear ratios.

In conventional syncromesh gearboxes, in order to change gears it is necessary to disengage the "forward" or "reverse" clutch, operate at least one other clutch to select a higher or lower gear, and then re-engage the forward or reverse clutch. This can result in a slow gear change which can result in a significant torque loss or even momentary complete loss of torque.

It is known to provide "powershift" gearboxes in vehicles such as performance cars on which, to overcome the problem of broken torque during gear shifting, gears are selected not by moving teeth but by the use of multi-plate, normally wet, clutches. Multi-ratio power shifting gearboxes, with a multitude of hydraulically operated multi-plate clutches, typically, have constantly meshing gears continually being rotated in both driven and idle states. The idling gears in turn drive one half of the multi-plate clutch assemblies which creates both heat and inertia drag due to oil churning etc. These inertia/drag loads are significant and can create power losses, leading to higher fuel consumption and/or longer journey times in high speed machines.

Twin clutch gearboxes attempt to provide the unbroken torque available from powershift gearboxes without the loss of efficiency. Successive gears are provided on alternate lay shafts. Conventionally, such twin clutch/alternate lay shaft gearboxes have the clutches located in line with the alternate lay shafts which makes the gearboxes relatively long.

It is an object of the present invention to provide a new or improved vehicle transmission.

SUMMARY OF THE INVENTION

According to a first aspect of the invention, we provide an automatic powershift vehicle transmission comprising an input shaft, an output shaft parallel to and alongside the input shaft, first and second intermediate shafts each being parallel to and alongside the input shaft, a lay shaft parallel to and alongside the output shaft, gearing provided on the input, output, intermediate, and lay shafts, the gearing providing first, second, third and fourth forward driving paths from the input shaft to the output shaft, with a gear ratio between the input shaft and output shaft decreasing from the first to the fourth forward driving path, a first clutch between the ends of the input shaft and which is operable to establish a driving connection between the input shaft and output shaft along the first or third forward driving paths, through the first intermediate shaft and gearing carried on the lay shaft, and a second clutch between the ends of the input shaft which is operable to establish a driving connection between one of the input shaft and output shaft along the second forward driving path through the second intermediate shaft and gearing carried on the lay shaft, and the fourth forward driving path, a third clutch for establishing the first or third forward driving path when the first clutch is operative, and a fourth clutch for establishing the second or fourth forward driving path when the second clutch is operative.

By providing a transmission in accordance with the invention, the time taken to change up a gear (i.e. from the first to the second, the second to the third or the third to the fourth driving path), or change down a gear (i.e. from the fourth to the third, the third to the second or the second to the first driving path) is reduced, without loss of torque, and with a longitudinally compact gearbox.

The respective axes about which the input, output and first and second intermediate shafts rotate may be substantially parallel with each others.

The first and third driving paths may include a plurality of meshing gears supported on the input, output and first and second intermediate shafts.

The second and fourth driving paths may include a plurality of meshing gears also supported on the input, output and first and second intermediate shafts.

The lay shaft may have an axis of rotation is substantially parallel to the axes of rotation clutch of the input, output and first and second intermediate shafts.

The gearing for at least the first, second and third driving paths may pass through gearing provided on the lay shaft.

The third clutch may be operable to establish a driving connection between the said gearing and the lay shaft.

The axis of the output shaft and one of the intermediate shafts may be substantially coaxial. Preferably the axis of both intermediate shafts is coaxial with the axis of the output shaft.

The fourth clutch may be operable to establish a driving connection between one of the intermediate shafts and the output shaft.

The fourth clutch may also be operable to establish driving connection between the one of the intermediate shifts and the lay shaft.

The transmission may include a reverse shaft and gearing provided on the reverse shaft providing first, second, third and fourth reverse driving paths from the input shaft to the output shaft, via the reverse shaft, with a gear ratio between the input shaft and output shaft decreasing from the first to the fourth reverse driving path.

The transmission may include a fifth clutch operable to establish a driving connection between the input shaft and output shaft, via the reverse shaft, along the first reverse or third reverse driving paths and a sixth clutch operable to establish a driving connection between the input shaft and output shaft, via the reverse shaft, along the second reverse or fourth reverse driving paths.

The fifth or sixth clutch may be positioned on the reverse shaft between its ends.

Both the fifth and sixth clutches may be positioned on the reverse shaft between its ends.

The axis about which the reverse shaft rotates may be substantially parallel to the axis of the input shaft.

The first, second, third and fourth reverse driving paths may include a plurality of meshing gears supported on the input, reverse and output shaft.

The fifth clutch may be operable to establish a driving connection between either of a gear of the first reverse or third reverse driving path and the reverse shaft.

The sixth clutch may be operable to establish a driving connection between either of a gear of the second reverse or fourth reverse driving path and the reverse shaft.

Gearing for at least the first, second and third reverse driving paths may pass through gearing provided on the lay shaft.

The vehicle transmission may be for a material handling vehicle.

BRIEF DESCRIPTION OF THE DRAWINGS

The invention will now be described by way of example only with reference to the accompanying drawings, of which.

DETAILED DESCRIPTION

Figure 1:
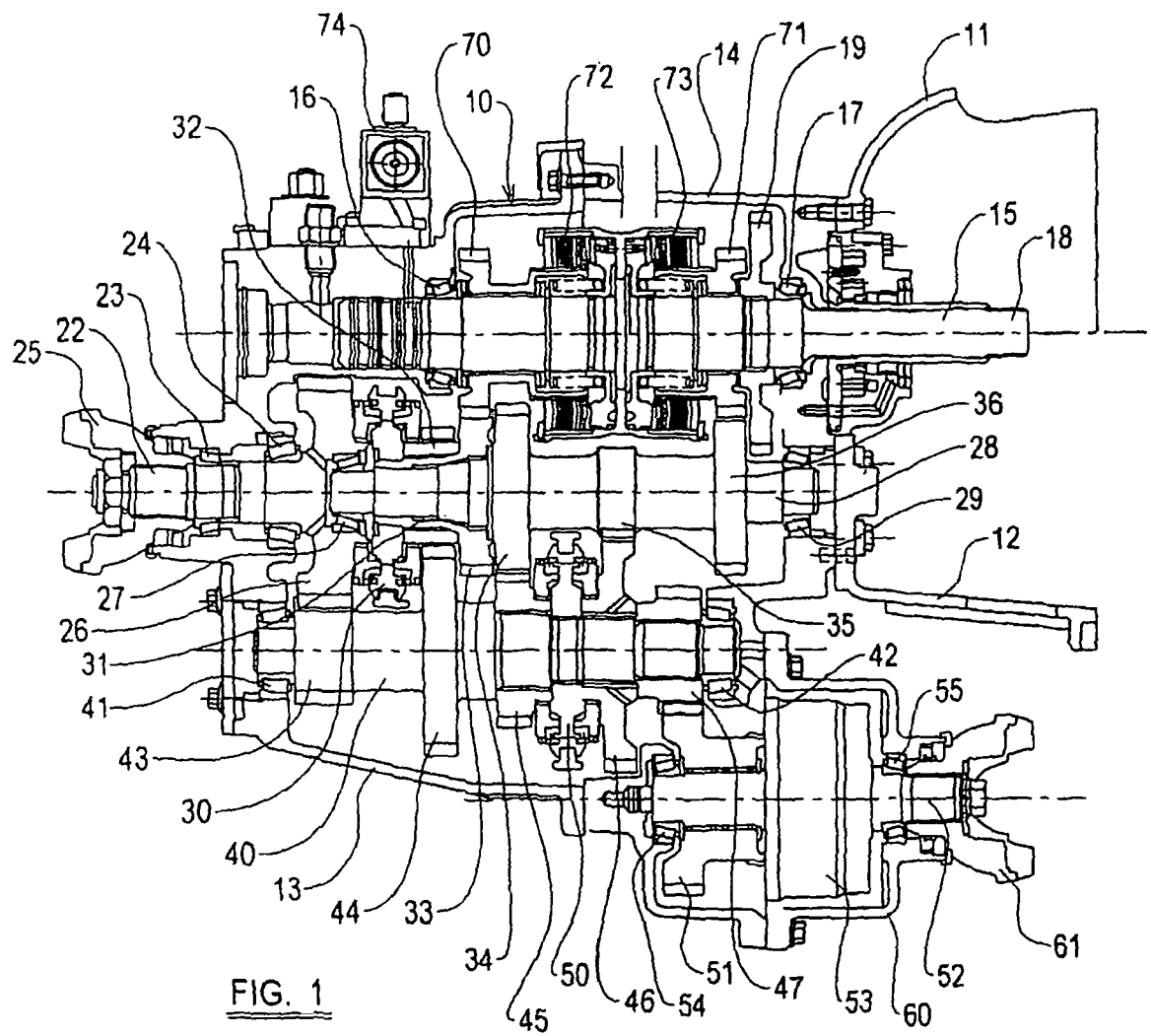
FIG. 1 is a side, part cross-sectional, view through a material handling vehicle transmission in accordance with the present invention.
Figure 2:
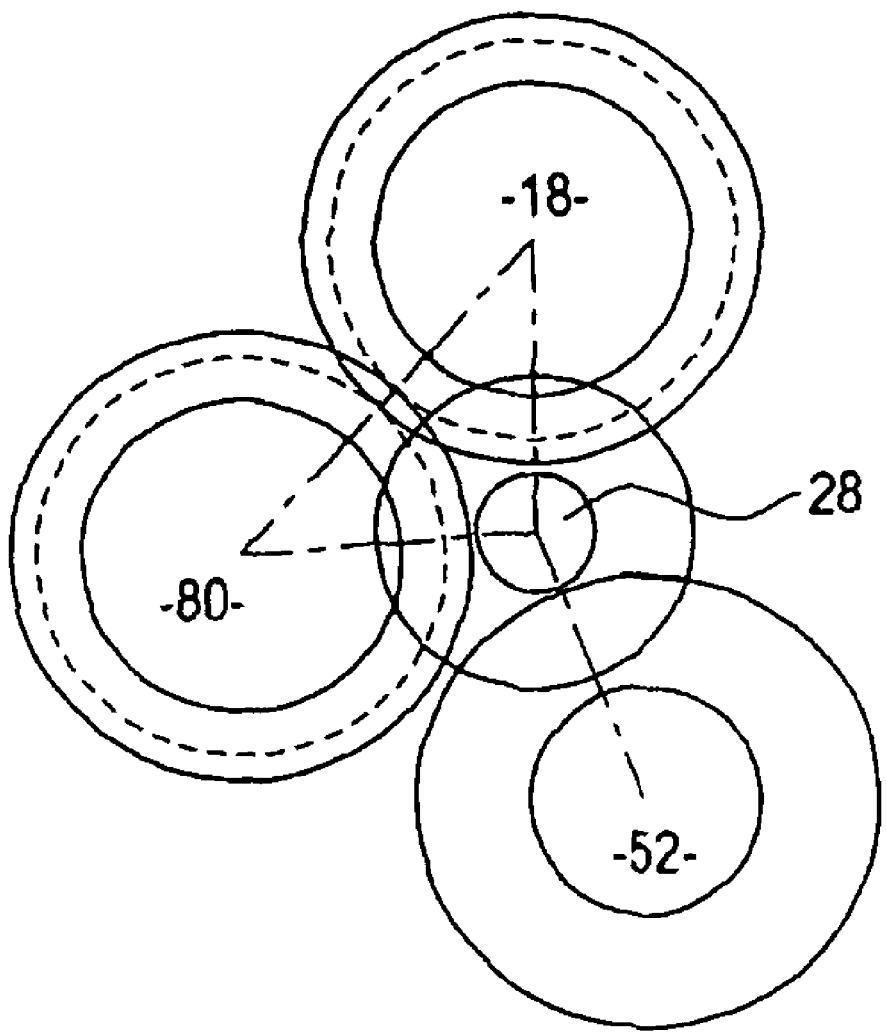
FIG. 2 is an end view of the transmission of FIG. 1.

Referring to FIG. 1, this shows a material handling vehicle transmission, comprising a casing indicated generally at 10, which includes a plurality of casing parts held together by bolts. The transmission also includes an input shaft 18 an output shaft 22, a first intermediate shaft, in the form of a main shaft 28, and a second intermediate shaft 31. As well as gearing to provide forward movement of the vehicle, the transmission is also provided with reverse gearing including a reverse shaft 80 supported in the casing. A gear 19 which is rotationally fast with the input shaft 18 meshes with a gear 83 which itself is rotationally fast with reverse shaft 80, so that the input shaft 18 and reverse shaft 80 always rotate at the same time, but in opposite directions. The reverse shaft 80 and its gearing will be described in greater detail hereinafter.

One of the casing parts, indicated at 11, includes a portion 12 which is generally in the form of a bell-shaped housing for connection to a prime mover in the form of an internal combustion engine. The bell-housing is shaped so as to receive a torque converter of known kind (not shown). The casing part 11 forms one end of the casing 10 of the transmission: the opposite end of the casing 10 is afforded by a casing part 13 and there is also an intermediate casing part 14 supported therebetween.

The input shaft 18 is supported on roller bearings 16, 17 in the casing parts 13, 14 respectively. The input shaft 18 protrudes through the casing part 11 and into the bell-shaped portion 12 and ends in a splined portion 15 for engagement with an output of a torque converter (not shown) whose input is connected to an output, such as the crankshaft, of the internal combustion engine.

The input shaft 18 supports two spaced gears 70, 71 and a pair of respective clutches, second clutch 72, and first clutch 73, which will be discussed in greater detail hereinafter.

Each clutch 72, 73 is a multi-plate hydraulically operated clutch, whereby a torque-transmitting connection can be established between the input shaft 18 and its respective gear 70, 71.

Each clutch 72, 73 is generally conventional in its construction and will therefore not be described in detail herein, except to say that it includes a plurality of interleaved annular plates respectively rotationally fast with a clutch drum and a clutch hub which in turn are rotationally fast with the input shaft 18 and its respective gear 70, 71. The interleaved plates are arranged to be brought into frictional torque-transmitting connection with one another when the clutch is supplied with hydraulic fluid under pressure, such fluid being introduced by way of a drilling through the interior of the input shaft and operating a piston incorporated in the clutch. Hydraulic fluid is applied by controlling valve means generally shown at 74.

An output shaft 22 is supported in the casing part 13, by bearings 23, 24. Outside the casing part 13, the output shaft 22 has an output drive flange 25 secured thereto, for connection with further drive line components leading to a ground-engaging means of the vehicle. In this example, such components may include a differential gearing and/or one or more universal jointed drive shafts, for connection to a pair of road wheels, or a crawler track, for the vehicle.

Within the casing 11, the output shaft 22 has a portion in the form of an output gear 26 and, within a recess in the innermost end of the output gear 26 there is supported in a bearing 27 one end of a first intermediate shaft comprising a main shaft 28. The other end of the main shaft 28 is carried by a taper bearing 29 in the casing part 14. The end of the main shaft 28 adjacent the output gear 26 carries a fourth clutch 30. The clutch 30 is located between the gear 26 of the output shaft 22 and a gear 32. The gear 32 is carried by and rotatable around a second intermediate shaft 31, which itself is carried by and rotatable around the main shaft 28. The intermediate shaft 31 also has a gear 33 which meshes with the gear 70 on the input shaft 18. The main shaft 28 also supports three spaced gears 34, 35, 36 which are each rotationally fast with the main shaft 28 and which will be discussed in greater detail hereinafter.

The clutch 30 is operable to establish a torque-transmitting connection between the second intermediate shaft 31 and the output shaft 22, or between the second intermediate shaft 31 and the gear 32.

A lay shaft 40 is also provided and is supported by roller bearings 41, 42 in the casing parts 13, 14 respectively. The lay shaft 40 is provided with a gear 43 which meshes with the gear 26, and carries four other gears 44, 45, 46, 47. The gear 44 is rotationally fast with the lay shaft 40 and meshes with the gear 32 supported on the intermediate shaft 31.

The input shaft 18, output shaft 22, lay shaft 40 and intermediate shafts 28, 31 are located alongside one another in that they are co-extensive and are disposed with their axes mutually parallel or coincident, and that a plane intersecting one of the shafts perpendicular to its axis of rotation will intersect one or more of the other shafts.

The gears 45, 46 are carried by and rotatable around the lay shaft 40 at either side of a third clutch 50. The clutch 50 is operable to establish a torque-transmitting connection between either of the gears 45, 46 and the lay shaft 40.

The gear 45 meshes with the gear 34 on the main shaft 28 and the gear 46 meshes with the gear 35 on the main shaft 28. The gear 36 meshes with the gear 71 on the input shaft 18.

The gear 47 is positioned between the gear 46 and the roller bearing 42 and is rotationally fast with the lay shaft 40. The gear 47 meshes with a further gear 51 carried by and rotatable around an additional output shaft 52 and able to be clutched thereto by a clutch 53, which once again is of the type above described. The shaft 52 is supported in taper roller bearings 54, 55 and extends out of an additional casing part 60. This end of the shaft 52 supports a drive flange 61 for connection by way of the drive line components such as universally jointed shafts and so on, to further driveable wheels of the vehicle.

In a typical vehicle, the output at the flange 61 will be brought into use, by engagement of the clutch 53, only when the vehicle is required to be used in four-wheel drive mode, the vehicle normally being used with two wheels driven only from the driving flange 25.

Figure 3:
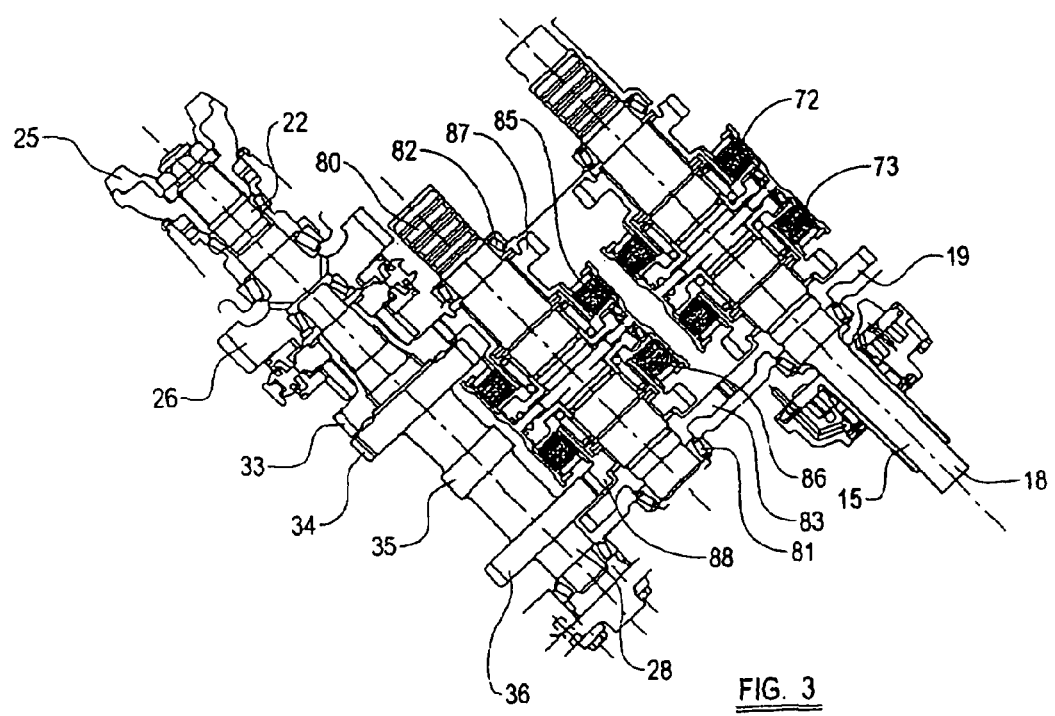
FIG. 3 is a further cross-sectional view through the transmission of FIG. 1.

Referring to FIG. 3, which is a cross-sectional view through the axes of rotation of the input shaft 18, reverse shaft 80, main shaft 28 and output shaft 22, the reverse shaft 80 is supported on roller bearings 81, 82 in the casing parts 13, 14 respectively. The reverse shaft 80 supports two spaced gears 87, 88 and a fifth clutch 85 and a sixth clutch 86. The clutches 85, 86 operate in the same way as the clutches 72, 73 whereby a torque-transmitting connection can be established between the reverse shaft 80 and the respective gear 87, 88.

The transmission as above described includes four forward driving paths providing a gear ratio between the input shaft and output shaft which decreases from the first to the fourth forward driving path, and four reverse driving paths which provide a gear ratio between the input shaft and output shaft, via the reverse shaft 80, in an opposite direction to that of the forward driving paths, which also decrease from the first to the fourth reverse driving path.

The first forward driving path (first forward gear) is provided along the input shaft 18 and the gears 71, 36, 35, 46, 43 and 26 to the output shaft 22. The second forward driving path (second forward gear) is provided along the input shaft 18 and the gears 70, 33, 32, 44, 43 and 26 to the output shaft 22. The third forward driving path (third forward gear) is provided along the input shaft 18 and the gears 71, 36, 34, 45, 43 and 26 to the output shaft 22. Finally, the fourth forward driving path (fourth forward gear) is provided along the input shaft 18 and the gears 70 and 33 to the output shaft 22. The fourth forward-driving path in this example provides a 1:1 ratio between the rotation speeds of the input shaft 18 and the output shaft 22.

The first reverse driving path (first reverse gear) is provided along the input shaft 18 through the gears 19, 83 to the reverse shaft 80 and then through the gears 88, 36, 35, 46, 43 and 26 to the output shaft 22. The second reverse driving path (second reverse gear) is provided along the input shaft 18 through the gears 19, 83 to the reverse shaft 80 and then through the gears 87, 33, 32, 44, 43 and 26 to the output shaft 22. The third reverse driving path (third reverse gear) is provided along the input shaft 18 through the gears 19, 83 to the reverse shaft 80 and then through the gears 88, 36, 34, 45, 43 and 26 to the output shaft 22. Finally, the fourth reverse driving path (fourth reverse gear) is provided along the input shaft 18 through the gears 19, 83 to the reverse shaft 80 and then through the gears 87 and 33 to the output shaft 22. The fourth reverse driving path in this example provides a 1:1 ratio between the rotation speeds of the input shaft 18 and the output shaft 22.

To engage first forward gear, firstly the clutch 50 establishes a torque-transmitting connection between the gear 46 and the lay shaft 40. The clutch 73 then establishes a torque-transmitting connection between the gear 71 and the input shaft 18. The gear 71 thus rotates, which in turn causes the 36 also to rotate. As the gear 36 is rotationally fast with the main shaft 28, the main shaft 28 and the gear 35 also rotate. As the gear 46 meshes with the gear 35, the gear 46 and the lay shaft 40 also rotate. Rotation of the lay shaft 40 effects rotation of the gear 43, which in turn rotates the gear 26 and the output shaft 22.

Figure 4:
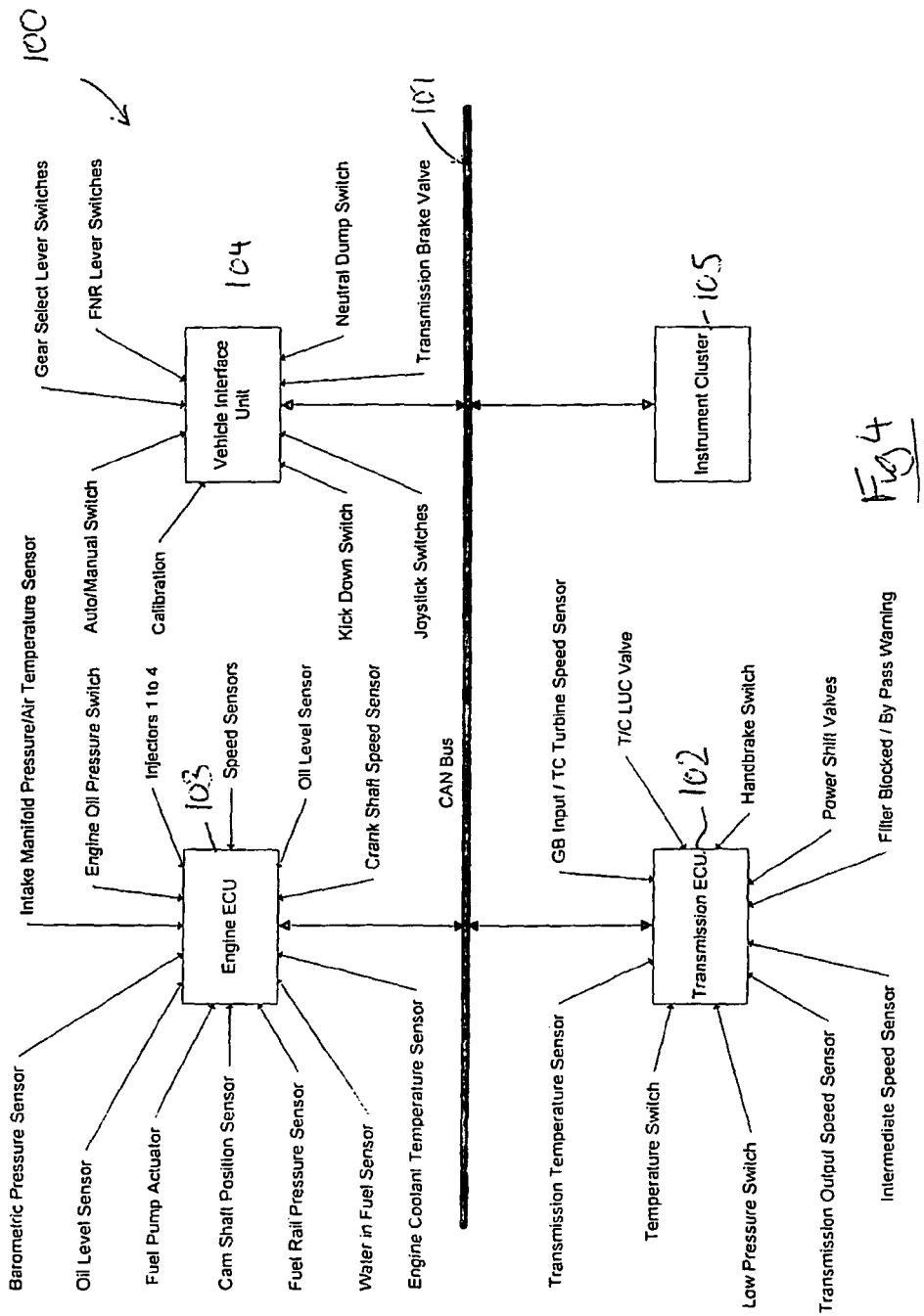
FIG. 4 is diagrammatic illustration of a control system for use on a vehicle provided with the transmission of FIG. 1.

The transmission may also include a controller, shown at 102 in FIG. 4, to assess which gear the vehicle is likely to require next. Such a controller may sense appropriate parameters, such as, for example, changes in acceleration and/or torque of the input shaft 18, the speed of the output shaft 22 and the accelerator position. The degree of automation may also be selected as appropriate. For example, the next gear may be pre-selected by the driver, or may be automatically selected by the controller, or may be selected by the controller but allow the driver to over-ride the controller.

If the controller decides that the vehicle is likely next to require second forward gear, it causes the clutch 30 to establish a torque-transmitting connection between the intermediate shaft 31 and the gear 32. As the gear 32 meshes with the gear 44, which is rotationally fast with the lay shaft 40, connection between the gear 32 and the intermediate shaft 31 causes its gear 33 and also the gear 70 to rotate.

When a user decides to change from first forward gear to second forward gear, all that is required is for the clutch 73 to disengage the connection between the gear 71 and the input shaft 18, and subsequently for the clutch 72 to establish a torque-transmitting connection between the gear 70 and the input shaft 18, thus driving the output 22.

If the sensing means decides that the vehicle will require changing back to first forward gear, the connection between the gear 46 and the lay shaft 40 is maintained. Thus if the user does decide to change back to first forward gear from second forward gear, all that is required is for the clutch 72 to disengage the connection of the gear 70 to the input shaft 18 and for the clutch 73 to establish a connection between the input shaft 18 and the gear 71.

However, if the sensing means decides that the vehicle is likely to require third forward gear, it causes the clutch 50 to disengage the gear 46 from the lay shaft 40 and subsequently to establish a torque-transmitting connection between the gear 45 and the lay shaft 40. This effectively prepares third forward gear for use.

When a user decides to change from second forward gear to third forward gear, all that is required is for the clutch 72 to disengage the connection between the gear 70 and the input shaft 18, and subsequently for the clutch 73 to establish a torque-transmitting connection between the gear 71 and the input shaft 18, thus driving the output 22.

If the sensing means decides that the vehicle will require changing back to second forward gear, the connection between the intermediate shaft 31 and the gear 32 is maintained. Thus if the user does decide to change back to second forward gear from third forward gear, all that is required is for the clutch 73 to disengage the connection of the gear 71 to the input shaft 18 and for the clutch 72 to establish a connection between the input shaft 18 and the gear 70.

However, if the sensing means decides that the vehicle is likely to require fourth forward gear, it causes the clutch 30 to disengage the connection between the intermediate shaft 31 and the gear 32 and subsequently to establish a torque-transmitting connection between the intermediate shaft 31 and the output shaft 22. This effectively prepares fourth forward gear for use.

When a user decides to change from third forward gear to fourth forward gear, all that is required is for the clutch 73 to disengage the connection between the gear 71 and the input shaft 18, and subsequently for the clutch 72 to establish a torque-transmitting connection between the gear 70 and the input shaft 18, thus driving the output 22.

The connection between the gear 45 and the lay shaft 40 by the clutch 50 can be maintained so that third gear is prepared for use. However, it may be desirable not to maintain the connection between the gear 45 and the lay shaft 40 during high speed operation of the transmission for improved efficiency and less drag.

In the case where third gear is prepared for use, when a user eventually decides to change from fourth forward gear to third forward gear, all that is required is for the clutch 72 to disengage the connection between the gear 70 and the input shaft 18, and subsequently for the clutch 73 to establish a torque-transmitting connection between the gear 71 and the input shaft 15, thus driving the output 22. The operation of the clutches 72, 73 preferably overlaps to provide unbroken torque.

If third forward gear is not prepared for use, before the clutch 72 is disengaged or at the same time, the clutch 50 must establish a torque-transmitting connection between the gear 45 and the lay shaft 40. Then the clutch 73 can be engaged to establish a torque-transmitting connection between the gear 71 and the input shaft 18, thus driving the output 22 in third forward gear.

Changing between successive reverse gears is effected in a similar fashion to that described above when changing between successive forward gears. However, instead of the clutches 72 and 73 being engaged or disengaged as required, these are both disengaged and instead either of the reverse clutches 85 or 86 is engaged to provide the first, second, third or fourth reverse gear as required.

Furthermore, it must be noted that it is possible to alter the ratio of the gears 19, 83 so that the input shaft 18 and reverse shaft 80 rotate at different speeds. This means that each respective reverse gear can be made faster or slower than its respective forward gear by altering the ratio of the gears 19, 83.

An example of a control system for a material handling vehicle provided with such a transmission is shown at 100 in FIG. 4. The control system has a bus 101, in this example a CANBus, through which elements of the control system are able to communicate. The transmission controller is shown at 102. Also connected to the bus 101 is an engine electronic control unit (ECU) 103, a vehicle interface unit 104, and an instrument cluster 105 to display operating parameters and warnings to an operator of the vehicle. As illustrated, the controller 102 is able to receive inputs from a plurality of sensors and inputs, including the transmission temperature and fluid pressure, speed sensors at different points in the transmission and other warning inputs. The controller 102 is also able to receive data from the engine ECU 103, such as the speed sensors or any other data which may be suitable to assess when a gear change is likely to be required The transmission provides unbroken torque during gear shifting but will have a higher efficiency than powershift transmissions, as the number of clutch packs compared to a typical transmission is reduced.

Other than the clutches 72, 73, 85, 86, 53 the clutches in the transmission in this example comprise synchromesh clutches, but may comprise other clutch types if desired.

The transmission described herein is longitudinally compact by virtue of locating the first and second clutches between the ends of the input shaft, rather than at the ends of separate shafts, and by providing driving connections using a plurality of short, generally parallel intermediate and lay shafts.

The arrangement fills the volume of the transmission casing in an efficient manner and provides a compact form factor allowing shorter wheel base or more compact vehicles.

Although in this embodiment the clutches 72, 73 are both provided on the input shaft 18, it must be understood that they could be positioned elsewhere within the transmission. For example, one of the clutches could be provided on the intermediate shaft 31 or the main shaft 28, or on a further lay shaft. Providing the clutches mounted on a shaft alongside one or more of the other shaft, the longitudinal compactness of the gearbox may be maintained.

Although the transmission shown herein has 4 forward and 4 reverse gear ratios for clarity, it will be apparent that any desired number of gears may be provided. For example, the JCB 'Fastrac' (RTM) has 54 forward and 18 reverse gears.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An automatic powershift vehicle transmission comprising:
   an input shaft:
   an output shaft parallel to and alongside the input shaft;
   first and second intermediate shafts each being parallel to and alongside the input shaft;
   a lay shaft parallel to and alongside the output shaft;
   gearing provided on the input, output, intermediate, and lay shafts, the gearing providing first, second, third and fourth forward driving paths from the input shaft to the output shaft, with a gear ratio between the input shaft and output shaft decreasing from the first to the fourth forward driving path;
   a first clutch between the ends of the input shaft and which is engageable to establish a driving connection between the input shaft and output shaft along the first or third forward driving paths, through the first intermediate shaft and gearing carried on the lay shaft; and
   a second clutch between the ends of the input shaft which is engageable to establish a driving connection between the input shaft and output shaft along one of the second forward driving path through the second intermediate shaft and gearing carried on the lay shaft, and the fourth forward driving path,
   a third clutch for establishing the first or third forward driving path when the first clutch is engaged and the second clutch is disengaged,
   and a fourth clutch for establishing the second or fourth forward driving path when the second clutch is engaged and the first clutch is disengaged.

2. A transmission according to claim 1 wherein the respective axes about which each of the input, output and first and second intermediate shafts rotate are substantially parallel with each other.

3. A transmission according to claim 1 wherein the gearing providing the first and third forward driving paths includes meshing gears supported on the input, output and first intermediate shaft.

4. A transmission according claim 1 wherein the gearing providing the second and fourth forward driving paths includes meshing gears supported on the input, output and second intermediate shaft.

5. A transmission according to claim 1 wherein the axis of the output shaft and one of the intermediate shafts is substantially coaxial.

6. A vehicle transmission according to claim 1 wherein the axis of both intermediate shafts is coaxial with the axis of the output shaft.

7. A transmission according to claim 1 wherein the vehicle transmission is for a material handling vehicle.

8. A transmission according to claim 1 wherein the third clutch and fourth clutch are both engaged when any one of the first and second and third and fourth driving paths are engageable to establish a driving connection between the input shaft and output shaft.

9. A transmission according to claim 1 wherein the fourth clutch is engageable to establish a driving connection between one of the intermediate shafts and the output shaft.

10. A transmission according to claim 9 wherein the fourth clutch is engageable to establish a driving connection between the one of the intermediate shafts and the lay shaft.

11. A transmission according to claim 1 wherein the lay shaft has an axis of rotation that is substantially parallel to the axes of rotation of the input, output and first and second intermediate shafts.

12. A transmission according to claim 11 wherein the driving path for at least the first, second and third forward driving paths passes through a gear provided on the lay shaft.

13. A transmission according to claim 12 wherein the third clutch is engageable to establish a driving connection between the gear and the lay shaft.

14. A transmission according to claim 1 further comprising a reverse shaft and gearing provided on the reverse shaft providing first, second, third and fourth reverse driving paths from the input shaft to the output shaft, via the reverse shaft, with a gear ratio between the input shaft and output shaft decreasing from the first to the fourth reverse driving path.

15. A transmission according to claim 14 wherein the gearing for at least the first, second and third reverse driving paths passes through gearing provided on the lay shaft.

16. A transmission according claim 14 further including a fifth clutch engageable to establish a driving connection between the input shaft and output shaft, via the reverse shaft, along the first reverse or third reverse driving paths and a sixth clutch engageable to establish a driving connection between the input shaft and output shaft, via the reverse shaft, along the second reverse or fourth reverse driving paths.

17. A transmission according to claim 16 wherein the first, second, third and fourth reverse driving paths include meshing gears supported on the input, reverse and output shaft.

18. A transmission according to claim 16 wherein the fifth clutch is engageable to establish a driving connection between either of a gear of the first reverse or third reverse driving path and the reverse shaft.

19. A transmission according to claim 16 wherein the axis about which the reverse shaft rotates is substantially parallel to the axis of the input shaft.

20. A transmission according to claim 16 wherein the sixth clutch is engageable to establish a driving connection between either of a gear of the second reverse or fourth reverse driving path and the reverse shaft.

21. A transmission according to claim 16 wherein either the fifth or sixth clutch is positioned on the reverse shaft between its ends.

22. A transmission according to claim 21 wherein both the fifth and sixth clutches are positioned on the reverse shaft between its ends.

* * * * *